United States Patent
Devasigamani

(10) Patent No.: US 12,546,257 B2
(45) Date of Patent: Feb. 10, 2026

(54) SYSTEM FOR RECOVERING GASEOUS DIHYDROGEN PRODUCED IN A LIQUID DIHYDROGEN DISTRIBUTION DUCT OF AN AIRCRAFT

(71) Applicant: Airbus Operations SAS, Toulouse (FR)

(72) Inventor: Nandakumar Devasigamani, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 100 days.

(21) Appl. No.: 18/643,455

(22) Filed: Apr. 23, 2024

(65) Prior Publication Data

US 2024/0360792 A1 Oct. 31, 2024

(30) Foreign Application Priority Data

Apr. 26, 2023 (FR) ........................... 2304230

(51) Int. Cl.
*F02C 7/22* (2006.01)
*B64D 37/30* (2006.01)
(Continued)

(52) U.S. Cl.
CPC ................ *F02C 7/22* (2013.01); *B64D 37/30* (2013.01); *F02C 9/263* (2013.01); *F17C 9/00* (2013.01);
(Continued)

(58) Field of Classification Search
CPC . F02C 7/22; F02C 9/263; B64D 37/30; F17C 9/00; F17C 2205/0326;
(Continued)

(56) References Cited

U.S. PATENT DOCUMENTS

2015/0362128 A1* 12/2015 Sanglan .................. F17C 5/007
62/50.2
2018/0372273 A1* 12/2018 Sonderegger ............. F17C 7/04
(Continued)

FOREIGN PATENT DOCUMENTS

DE 102007023821 A1 11/2008
FR 3006742 A1 12/2014

OTHER PUBLICATIONS

French Search Report for corresponding French Patent Application No. 2304230 dated Oct. 25, 2023.

*Primary Examiner* — Patrick C Williams
(74) *Attorney, Agent, or Firm* — Greer, Burns & Crain, Ltd.

(57) ABSTRACT

A system for recovering gaseous dihydrogen produced in a distribution duct arranged between a main tank and a dihydrogen consumer device, the distribution duct comprising a pump. The system comprises: an auxiliary tank; a bypass duct, arranged between the distribution duct and the auxiliary tank, downstream of the pump; a valve arranged on the bypass duct; a module for obtaining a temperature of the dihydrogen in the distribution duct, upstream of the pump. A control module of the valve opens the valve when the temperature is greater than a predetermined value and closes the valve when the temperature is less than or equal to the predetermined value.

9 Claims, 3 Drawing Sheets

(51) Int. Cl.
    *F02C 9/26* (2006.01)
    *F17C 9/00* (2006.01)
    *G05D 16/20* (2006.01)
    *G05D 23/19* (2006.01)

(52) U.S. Cl.
    CPC ..... *G05D 16/2013* (2013.01); *G05D 23/1917* (2013.01); *F17C 2205/0326* (2013.01); *F17C 2205/0332* (2013.01); *F17C 2221/012* (2013.01); *F17C 2223/0153* (2013.01); *F17C 2223/0161* (2013.01); *F17C 2223/033* (2013.01); *F17C 2225/0123* (2013.01); *F17C 2225/0161* (2013.01); *F17C 2227/0135* (2013.01); *F17C 2250/01* (2013.01); *F17C 2250/032* (2013.01); *F17C 2250/0439* (2013.01); *F17C 2250/0631* (2013.01); *F17C 2265/031* (2013.01); *F17C 2265/032* (2013.01); *F17C 2265/066* (2013.01); *F17C 2270/0189* (2013.01)

(58) Field of Classification Search
    CPC ........ F17C 2205/0332; F17C 2221/012; F17C 2223/0153; F17C 2223/0161; F17C 2223/033; F17C 2225/0123; F17C 2225/0161; F17C 2225/035; F17C 2227/0135; F17C 2250/01; F17C 2250/032; F17C 2250/0439; F17C 2250/0631; F17C 2250/0636; F17C 2265/031; F17C 2265/032; F17C 2265/066; F17C 2270/0189; F17C 13/026; G05D 16/2013; G05D 23/1917
    See application file for complete search history.

(56) References Cited

U.S. PATENT DOCUMENTS

2020/0080519 A1* 3/2020 Leidefeldt .............. F02M 21/06
2022/0195927 A1* 6/2022 Rambo ..................... F02C 6/08
2023/0026474 A1   1/2023 Sleiman

* cited by examiner

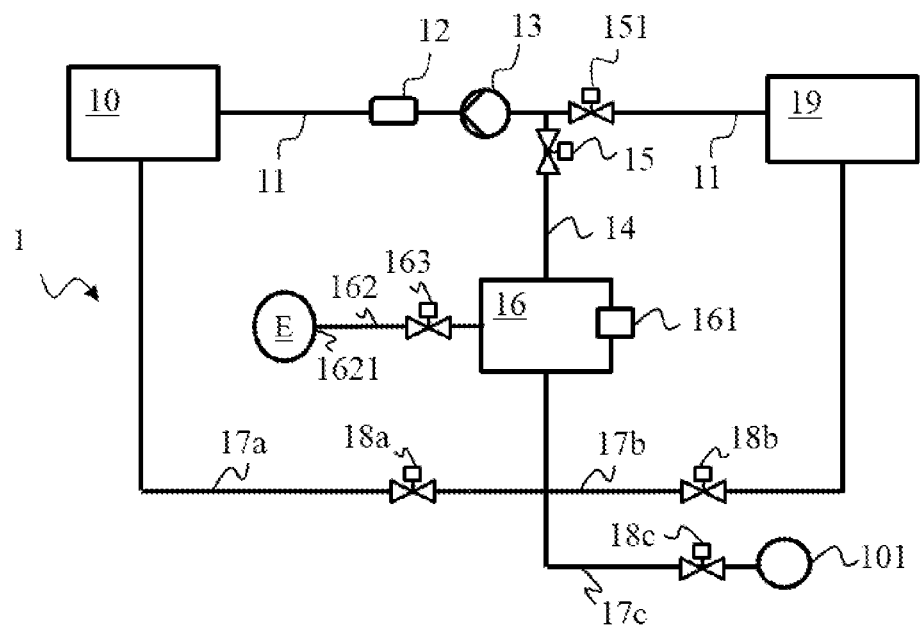
[Fig. 1]
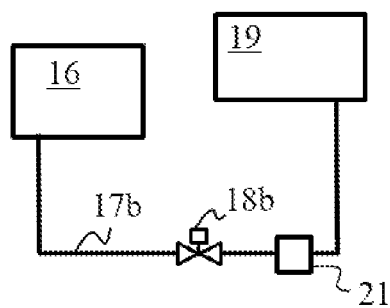
[Fig. 2A]

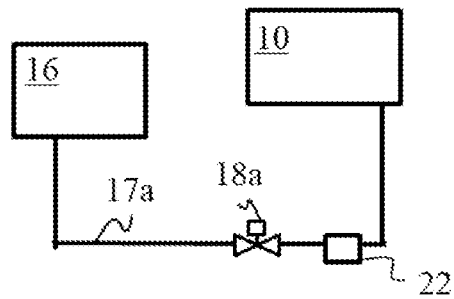
[Fig. 2B]
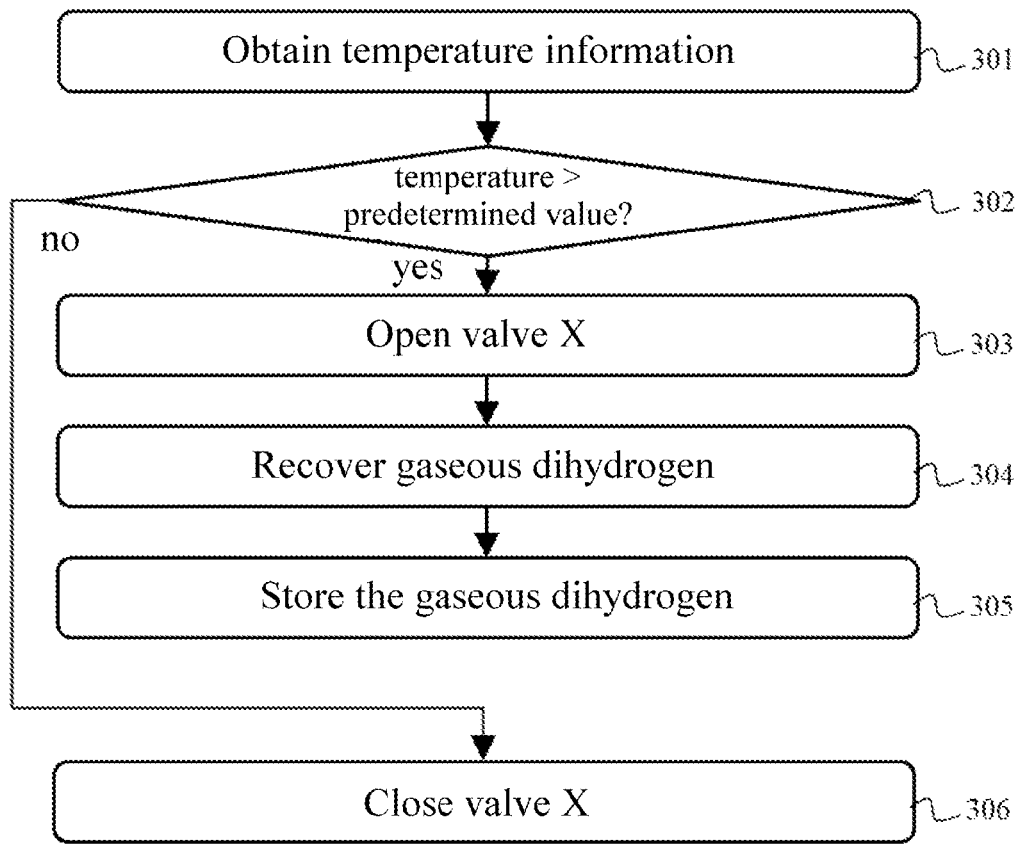
[Fig. 3]

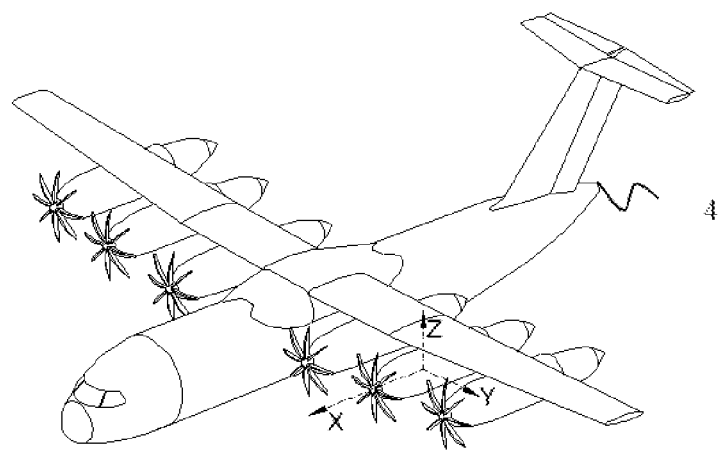
[Fig. 4]

SYSTEM FOR RECOVERING GASEOUS DIHYDROGEN PRODUCED IN A LIQUID DIHYDROGEN DISTRIBUTION DUCT OF AN AIRCRAFT

CROSS-REFERENCES TO RELATED APPLICATIONS

This application claims the benefit of French Patent Application Number 2304230 filed on Apr. 26, 2023, the entire disclosure of which is incorporated herein by way of reference.

FIELD OF THE INVENTION

The present invention relates to the field of the distribution of liquid dihydrogen and relates more particularly to a system for recovering gaseous dihydrogen produced by liquid dihydrogen evaporation in its circulation in a duct.

BACKGROUND OF THE INVENTION

The use of dihydrogen in aircraft, for example in order to supply an engine with hydrogen, necessitates the storage of dihydrogen in the liquid state and generally necessitates distributing or conveying dihydrogen in the liquid state. One difficulty linked to the distribution of liquid dihydrogen lies in the fact that a distribution duct needs to be at a temperature that is sufficiently low for the dihydrogen to remain in the liquid state. Now, when the dihydrogen begins to circulate in an initially empty duct, said duct is generally at a higher temperature and the liquid dihydrogen evaporates in its circulation in the duct. The duct therefore needs to be cooled before the dihydrogen can be used in conditions appropriate to the use which is made thereof. The cooling of the duct must then be performed in a phase prior to the use of the dihydrogen and can for example involve having liquid dihydrogen circulate in the duct until the dihydrogen no longer evaporates in its circulation.

However, in such a preliminary cooling step, gaseous dihydrogen is produced and cannot be used for the use for which it is initially intended. The gaseous dihydrogen thus produced is then generally discharged, which results in a waste of dihydrogen.

It is then desirable to mitigate these drawbacks of the state of the art. It is notably desirable to provide a solution which makes it possible to prevent the wastage of dihydrogen in the transient cooling phase and which makes it possible to use the dihydrogen which is vaporised in said transient cooling phase.

SUMMARY OF THE INVENTION

A system for recovering gaseous dihydrogen is proposed in which gaseous dihydrogen being produced by liquid dihydrogen evaporation in a distribution duct arranged between a main dihydrogen tank and a dihydrogen consumer device, the distribution duct comprising a pump to supply dihydrogen to the dihydrogen consumer device at a predefined temperature and at a predefined pressure, the gaseous dihydrogen recovery system comprising: an auxiliary tank; a bypass duct, arranged between the distribution duct and the auxiliary tank, downstream of the pump in a direction of circulation of the dihydrogen in the distribution duct; a first controlled valve arranged on the bypass duct; a module for obtaining information representative of a temperature of the dihydrogen in the distribution duct, upstream of the pump; and a control module of the first controlled valve configured to open the controlled valve when the information representative of the temperature of the dihydrogen in the distribution duct is greater than a predetermined value and to close the first controlled valve when the information representative of the temperature of the dihydrogen in the distribution duct is less than or equal to the predetermined value.

Thus, the gaseous dihydrogen produced by evaporation of liquid dihydrogen circulating in the distribution duct, in a transient phase of cooling of the distribution duct for example, can be recovered and stored in order to be used. The wastage of dihydrogen is thus avoided.

According to a particular embodiment, the gaseous dihydrogen recovery system further comprises a second controlled valve arranged on the distribution duct downstream of the bypass duct, and comprises a control module of said second controlled valve configured to close the second controlled valve when the first controlled valve is open and to open the second controlled valve when the first controlled valve is closed.

According to a particular embodiment, the gaseous dihydrogen recovery system further comprises at least one auxiliary duct arranged between the auxiliary tank and a dihydrogen storage or consumption device, said dihydrogen storage or consumption device being the main tank and/or the dihydrogen consumer device and/or a third-party device.

According to a particular embodiment, the gaseous dihydrogen recovery system further comprises a third controlled valve arranged on each auxiliary duct and comprising a control module of the third controlled valve configured to open said third controlled valve when a use of dihydrogen is required by the dihydrogen storage or consumption device linked by said auxiliary duct, and to close said third controlled valve otherwise.

According to a particular embodiment, the auxiliary tank has a gaseous dihydrogen storage volume designed to keep the gaseous dihydrogen pressure inside said auxiliary tank at a value greater than or equal to a predefined pressure.

According to a particular embodiment, the gaseous dihydrogen recovery system further comprises a discharge duct linking the auxiliary tank to an end of the discharge duct emerging in the open air, further comprises a shut-off valve arranged on the discharge duct and further comprises means configured to open the shut-off valve when the gaseous dihydrogen pressure in the auxiliary tank exceeds a predefined pressure threshold value and to close the shut-off valve when the gaseous dihydrogen pressure in the auxiliary tank is less than or equal to said predefined pressure threshold value.

Also proposed is an aircraft comprising a gaseous dihydrogen recovery system in any one of its embodiments.

Also proposed here is a method for recovering gaseous dihydrogen, the gaseous dihydrogen being produced by evaporation of liquid dihydrogen in a distribution duct arranged between a main tank and a dihydrogen consumer device, the distribution duct comprising a pump to supply dihydrogen to the dihydrogen consumer device at a predefined temperature and at a predefined pressure, the gaseous dihydrogen recovery method comprising: recovering gaseous dihydrogen from the distribution duct to a bypass duct, arranged between the distribution duct and an auxiliary tank, downstream of the pump in a direction of circulation of the dihydrogen in the distribution duct; storing the gaseous dihydrogen in the auxiliary tank; obtaining information representative of a temperature of the dihydrogen in the distribution duct, upstream of the pump; and controlling a first controlled valve arranged on the bypass duct so as to open the first controlled valve when the information representative of the temperature of the dihydrogen in the distribution duct is greater than a predetermined value and to close the first controlled valve when the information representative of the temperature of the dihydrogen in the distribution duct is less than or equal to the predetermined value.

According to a particular embodiment, the gaseous dihydrogen recovery method further comprises using the stored gaseous dihydrogen via at least one auxiliary duct arranged between the auxiliary tank and a dihydrogen storage or consumption device, said dihydrogen storage or consumption device being the main tank and/or the dihydrogen consumer device and/or a third-party device.

BRIEF DESCRIPTION OF THE DRAWINGS

The features of the invention mentioned above, and others, will become more clearly apparent on reading the following description of at least one exemplary embodiment, said description being given in relation to the attached drawings, in which:

FIG. 1 schematically illustrates a gaseous dihydrogen recovery system;

FIG. 2A schematically illustrates an auxiliary duct of the gaseous dihydrogen recovery system arranged between the auxiliary tank and a dihydrogen consumer device, according to a particular embodiment;

FIG. 2B schematically illustrates an auxiliary duct of the gaseous dihydrogen recovery system arranged between an auxiliary tank and a main tank, according to a particular embodiment;

FIG. 3 schematically illustrates a gaseous dihydrogen recovery method; and

FIG. 4 schematically illustrates an aircraft comprising the gaseous dihydrogen recovery system.

DETAILED DESCRIPTION OF THE PREFERRED EMBODIMENTS

FIG. 1 thus schematically illustrates a gaseous dihydrogen recovery system 1.

The gaseous dihydrogen is produced by evaporation of liquid dihydrogen circulating in a distribution duct 11 arranged between a main tank 10 and a dihydrogen consumer device 19. The main tank 10 is a liquid dihydrogen tank. The dihydrogen consumer device 19 is for example a hydrogen engine, using dihydrogen as fuel. The distribution duct 11 is intended to convey dihydrogen in a direction of circulation of the dihydrogen, from the main tank 10 to a dihydrogen consumer device 19. According to said direction of circulation of the dihydrogen, the term upstream is defined, with respect to the distribution duct 11, as a relative position situated closer to the main tank 10 while the term downstream is defined, with respect to the distribution duct 11, as a relative position situated closer to the dihydrogen consumer device 19.

The distribution duct 11 comprises a pump 13, for example a high-pressure pump intended to supply the dihydrogen consumer device 19. The pump 13 is configured to supply to the dihydrogen consumer device 19, in other words downstream of said pump 13, dihydrogen with temperature and pressure conditions predefined based on liquid dihydrogen in order to allow a correct operation of the dihydrogen consumer device 19. In a phase of nominal operation of the dihydrogen consumer device 19, the dihydrogen must remain in the liquid state in a portion of the distribution duct 11 situated between the main tank 10 and the pump 13. On the other hand, in a preliminary phase of cooling of the distribution duct 11 during which walls of the distribution duct 11 are cooled on contact with the liquid dihydrogen coming from the main tank 10, the dihydrogen circulating in the distribution duct 11 evaporates. The pump 13 then receives gaseous dihydrogen and cannot therefore supply dihydrogen with said predefined temperature and pressure conditions.

The recovery system 1 comprises a bypass duct 14, arranged between the distribution duct 11 and an auxiliary gaseous dihydrogen storage tank 16. The bypass duct 14 is linked to the distribution duct 11 at a position of said distribution duct 11 situated downstream of the pump in the direction of circulation of the dihydrogen in the distribution duct 11.

The recovery system 1 further comprises the auxiliary gaseous dihydrogen storage tank 16.

The recovery system 1 further comprises a first controlled valve 15 arranged on the bypass duct 14. The first controlled valve 15 can be open or closed.

The recovery system 1 further comprises a module 12 for obtaining information representative of a temperature of the dihydrogen in the distribution duct 11 upstream of the pump 13. The obtaining module 12 is for example a temperature sensor.

The recovery system 1 further comprises a first control module (not represented) of the first controlled valve 15 configured to open the first controlled valve 15 when the information representative of the temperature of the dihydrogen in the distribution duct 11 is greater than a predetermined value and to close the first controlled valve 15 when the information representative of the temperature of the dihydrogen in the distribution duct 11 is less than or equal to the predetermined value.

The predetermined value is for example a temperature value at which the dihydrogen evaporates, in other words changes from the liquid state to the gaseous state, and is equal to −252.87° C. or 20.28 K. Thus, when the dihydrogen circulating in the distribution duct 11 upstream of the pump 13 is gaseous, the first controlled valve 15 is open and the gaseous dihydrogen is recovered in the bypass duct 14. On the other hand, when the dihydrogen circulating in the distribution duct 11 upstream of the pump 13 is gaseous, the first controlled valve 15 is closed and the liquid dihydrogen remains in the distribution duct 11.

When the first controlled valve 15 is open, the dihydrogen recovered in the bypass duct 14 circulates from the distribution duct 11 to the auxiliary tank 16.

According to an exemplary embodiment, the recovery system 1 further comprises a second controlled valve 151 arranged on the distribution duct downstream of the bypass duct. The recovery system 1 further comprises a second control module (not represented) of said second controlled valve 151 configured to close the second controlled valve 151 when the first controlled valve 15 is open. Thus the recovery of the gaseous dihydrogen circulating in the distribution duct 11 is maximised since the circulation of the gaseous dihydrogen to the dihydrogen consumer device 19 is prevented. The second control module of said second controlled valve 151 is further configured to open the second controlled valve 151 when the first controlled valve 15 is open, so as to allow the dihydrogen circulating in the distribution duct 11 to circulate to the dihydrogen consumer device 19.

The recovery system 1 further comprises at least one auxiliary duct 17a, 17b, 17c arranged between the auxiliary tank 16 and a dihydrogen storage or consumption device 10, 19, 101. For example, the dihydrogen storage or consumption device is the main tank 10, or the dihydrogen consumer device 19 or a third-party device 101.

According to the example illustrated in FIG. 1, the recovery system 1 comprises a first auxiliary duct 17a arranged between the auxiliary tank 16 and the main tank 10, a second auxiliary duct 17b arranged between the auxiliary tank 16 and the dihydrogen consumer device 19 and a third auxiliary duct 17c arranged between the auxiliary tank 16 and the third-party device 101. The third-party device is for example a dihydrogen mixer intended to heat up an external flow of dihydrogen intended to apply a heat exchange with a heat-transfer fluid such that the heat-transfer fluid does not freeze in said heat exchange.

According to one embodiment, the recovery system 1 comprises a third controlled valve 18a, 18b, 18c arranged on each auxiliary duct 17a, 17b, 17c. Each third controlled valve 18a, 18b, 18c is controlled by a third control module associated with the dihydrogen storage or consumption device 10, 19, 101 linked by the auxiliary duct 17a, 17b, 17c concerned.

The third control module is configured to open the third controlled valve 18a, 18b, 18c when a use of dihydrogen is required by the dihydrogen storage or consumption device 10, 19, 101 concerned. The third control module is configured to close said third controlled valve 18a, 18b, 18c when the use of dihydrogen is not required by the dihydrogen storage or consumption device 10, 19, 101 concerned.

For example, the third control module associated with the third controlled valve 18a arranged on the first auxiliary duct 17a opens said third controlled valve 18a when a re-pressurisation of the main tank 10 is required, and closes said third controlled valve 18a when the re-pressurisation of the main tank 10 is not required.

According to another example, the third control module associated with the third controlled valve 18b arranged on the second auxiliary duct 17b opens said third controlled valve when a start-up of the dihydrogen consumer device 19 is required. Said third control module closes said third controlled valve 18b when the start-up of the dihydrogen consumer device 19 is not required, in other words before the start-up of the dihydrogen consumer device 19 or when the start-up is finished.

According to one embodiment, the auxiliary tank 16 comprises an electric heating device 161. The heating device 161 is configured to raise the temperature of the gaseous dihydrogen stored in said auxiliary tank 16 when a temperature of the gaseous dihydrogen stored in the auxiliary tank 16 is less than a predefined temperature. According to one example, the recovery system 1 comprises the second auxiliary duct 17b, the dihydrogen consumer device 19 is a hydrogen engine and the predefined temperature is a minimum temperature of gaseous dihydrogen necessary to start up a hydrogen engine. Thus, it is possible to obtain and use gaseous dihydrogen at a predefined temperature to start up the hydrogen engine.

According to one embodiment, the auxiliary tank 16 has a gaseous dihydrogen storage volume that is provided, designed and adapted to keep the gaseous dihydrogen pressure inside said auxiliary tank 16 at a value greater than or equal to a predefined pressure, for example 3 bar. The volume of the auxiliary tank 16 is designed by taking into account a quantity of gaseous dihydrogen that can be recovered in said auxiliary tank 16 in the preliminary phase of cooling of the distribution duct 11.

According to one embodiment, the recovery system 1 further comprises a discharge duct 162 linking the auxiliary tank 16 to an end 1621 of the discharge duct 162 emerging in the open air, for example on the outside E of an aircraft 4. The recovery system 1 further comprises a shut-off valve 163 arranged on the discharge duct 162 and comprises means for opening the shut-off valve 163 when the gaseous dihydrogen pressure in the auxiliary tank 16 exceeds a predefined threshold value of pressure and of closure of the shut-off valve 163 when the gaseous dihydrogen pressure in the auxiliary tank 16 is less than or equal to said predefined pressure threshold value. Thus, the accumulation of gaseous dihydrogen beyond a predefined pressure is prevented. According to one example, the shut-off valve 163 opens under a mechanical action resulting from a pressure exerted by a gas originating from the auxiliary tank 16 when said pressure exceeds the predefined pressure threshold value and closes otherwise. According to another example, the means for opening and closing the shut-off valve comprise a pressure sensor that makes it possible to obtain information representative of the pressure inside the auxiliary tank 16 and comprise a control module of the shut-off valve 163. The control module of the shut-off valve 163 is configured to open the shut-off valve 163 when the information representative of the dihydrogen pressure in the auxiliary tank 16 exceeds the predefined pressure threshold value and to close the shut-off valve 163 otherwise. The control module of the shut-off valve 163 comprises a processor capable of executing instructions loaded into a memory, causing the implementation of the steps of opening and of closure of the shut-off valve 163. The control module can comprise a processor of DSP (Digital Signal Processor) type or a microcontroller, or a machine or a dedicated electronic component (chip) or a dedicated set of electronic components (chipset), for example an FPGA (Field Programmable Gate Array) or ASIC (Application Specific Integrated Circuit) component. Generally, the control module of the shut-off valve 163, just like each control module of a valve described here, comprises electronic circuitry adapted and configured to implement the operations, methods and steps described here in relation to said control module.

FIG. 2A schematically illustrates the second auxiliary duct 17b of the recovery system 1 arranged between the auxiliary tank 16 and the dihydrogen consumer device 19, according to a particular embodiment.

According to said particular embodiment, said second auxiliary duct 17b comprises a gaseous dihydrogen pressure regulator 21. The pressure regulator 21 is for example a pressure limiter such as an orifice arranged in the second auxiliary duct 17b.

Thus, a variation of pressure of the gaseous dihydrogen in the auxiliary tank 16 and in the second auxiliary duct 17b resulting from a variation of volume of gaseous dihydrogen accumulated in the auxiliary tank 16 has a limited effect upon an injection of gaseous dihydrogen, via said second auxiliary duct 17a, into the dihydrogen consumer device 19.

FIG. 2B schematically illustrates the first auxiliary duct 17a of the recovery system 1 arranged between the auxiliary tank 16 and the main tank 10, according to a particular embodiment.

According to said particular embodiment, said first auxiliary duct 17a comprises a mass flow rate controller 22. The mass flow rate controller 22 makes it possible to control a mass flow of gaseous dihydrogen circulating to the main tank 10. Thus, it is possible to control the flow rate of gaseous dihydrogen injected into the main tank 10 in order to ensure that the quantity of gaseous dihydrogen injected into said main tank 10 is sufficient to allow a re-pressurisation of said main tank 10.

FIG. 3 schematically illustrates a gaseous dihydrogen recovery method.

According to one embodiment, the gaseous dihydrogen recovery method is triggered at regular intervals, for example every second.

In a step 301, the module 12 for obtaining information representative of a temperature of the dihydrogen in the distribution duct 11 upstream of the pump 13 obtains said information representative of a temperature of the dihydrogen.

In a next step 302, the first control module of the first controlled valve 15 compares said information representative of a temperature of dihydrogen to the predetermined temperature value. If the information representative of a temperature of dihydrogen is greater than the predetermined value, the first control module performs a step 303. Otherwise, the first control module performs a step 306.

In the step 303, the first control module of the first controlled valve 15 opens said first controlled valve 15 or keeps it open when said first controlled valve 15 is already open.

According to a particular embodiment, when the recovery system comprises the second controlled valve 151, the second control module closes said second controlled valve 151 or keeps it closed.

In a next step 304, the gaseous dihydrogen of the distribution duct 11 is recovered in the bypass duct 14.

In a next step 305, the gaseous dihydrogen recovered in the bypass duct 14 is stored in the auxiliary tank 16.

In the step 306, the control module of the first controlled valve 15 closes said first controlled valve 15 or keeps it closed when said first controlled valve 15 is already closed.

According to a particular embodiment, when the recovery system comprises the second controlled valve 151, the second control module opens said second controlled valve 151 or keeps it open FIG. 4 schematically illustrates the aircraft 4 comprising the gaseous dihydrogen recovery system 1, particularly advantageous for a use on board an aircraft inasmuch as it makes it possible to optimise the consumption of dihydrogen by reducing the losses.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A gaseous dihydrogen recovery system comprising:
a distribution duct arranged between a main tank and a dihydrogen consumer device, the distribution duct comprising a pump for supplying dihydrogen to the dihydrogen consumer device at a predefined temperature and at a predefined pressure, gaseous dihydrogen being produced by evaporation of liquid dihydrogen in the distribution duct, an auxiliary tank, a bypass duct arranged between the distribution duct and the auxiliary tank, downstream of the pump in a direction of circulation of the dihydrogen in the distribution duct, a first controlled valve arranged on the bypass duct, a module for obtaining information representative of a temperature of the dihydrogen in the distribution duct, upstream of the pump, and a control module of the first controlled valve configured to open the first controlled valve when the information representative of the temperature of the dihydrogen in the distribution duct is greater than a predetermined value and to close the first controlled valve when the information representative of the temperature of the dihydrogen in the distribution duct is less than or equal to the predetermined value.

2. The gaseous dihydrogen recovery system according to claim 1, further comprising:

a second controlled valve arranged on the distribution duct downstream of the bypass duct, and a control module of said second controlled valve configured to close the second controlled valve when the first controlled valve is open and to open the second controlled valve when the first controlled valve is closed.

3. The gaseous dihydrogen recovery system according to claim 1, further comprising:

at least one auxiliary duct arranged between the auxiliary tank and a dihydrogen storage or consumption device, said dihydrogen storage or consumption device being the main tank, or the dihydrogen consumer device, or a third-party device, or a combination thereof.

4. The gaseous dihydrogen recovery system according to claim 3, further comprising:

a third controlled valve arranged on each auxiliary duct and comprising a control module of the third controlled valve configured to open said third controlled valve when a use of dihydrogen is required by the dihydrogen storage or consumption device linked by said auxiliary duct, and to close said third controlled valve otherwise.

5. The gaseous dihydrogen recovery system according to claim 1, wherein the auxiliary tank has a gaseous dihydrogen storage volume provided to keep a gaseous dihydrogen pressure inside said auxiliary tank at a value greater than or equal to a predefined pressure.

6. The gaseous dihydrogen recovery system according to claim 1, further comprising:

a discharge duct linking the auxiliary tank to an end of the discharge duct that emerges in an open air, a shut-off valve arranged on the discharge duct and further comprising means configured to open the shut-off valve when a gaseous dihydrogen pressure in the auxiliary tank exceeds a predefined pressure threshold value and to close the shut-off valve when the gaseous dihydrogen pressure in the auxiliary tank is less than or equal to said predefined pressure threshold value.

7. An aircraft comprising:

the gaseous dihydrogen recovery system according to claim 1.

8. A gaseous dihydrogen recovery method, the gaseous dihydrogen being produced by evaporation of liquid dihydrogen in a distribution duct arranged between a main tank and a dihydrogen consumer device, the distribution duct comprising a pump for supplying dihydrogen to the dihydrogen consumer device at a predefined temperature and at a predefined pressure, the gaseous dihydrogen recovery method comprising:

recovering gaseous dihydrogen from the distribution duct to a bypass duct, arranged between the distribution duct and an auxiliary tank, downstream of the pump in a direction of circulation of the dihydrogen in the distribution duct, storing the gaseous dihydrogen in the auxiliary tank, obtaining information representative of a temperature of the dihydrogen in the distribution duct, upstream of the pump, and controlling a first controlled valve arranged on the bypass duct so as to open the first controlled valve when the information representative of the temperature of the dihydrogen in the distribution duct is greater than a predetermined value and to close the first controlled valve when the information representative of the temperature of the dihydrogen in the distribution duct is less than or equal to the predetermined value.

9. The gaseous dihydrogen recovery method according to claim 8, further comprising:

using the stored gaseous dihydrogen via at least one auxiliary duct arranged between the auxiliary tank and a dihydrogen storage or consumption device, said dihydrogen storage or consumption device being the main tank, or the dihydrogen consumer device, or a third-party device, or a combination thereof.

* * * * *